Patented June 21, 1927.

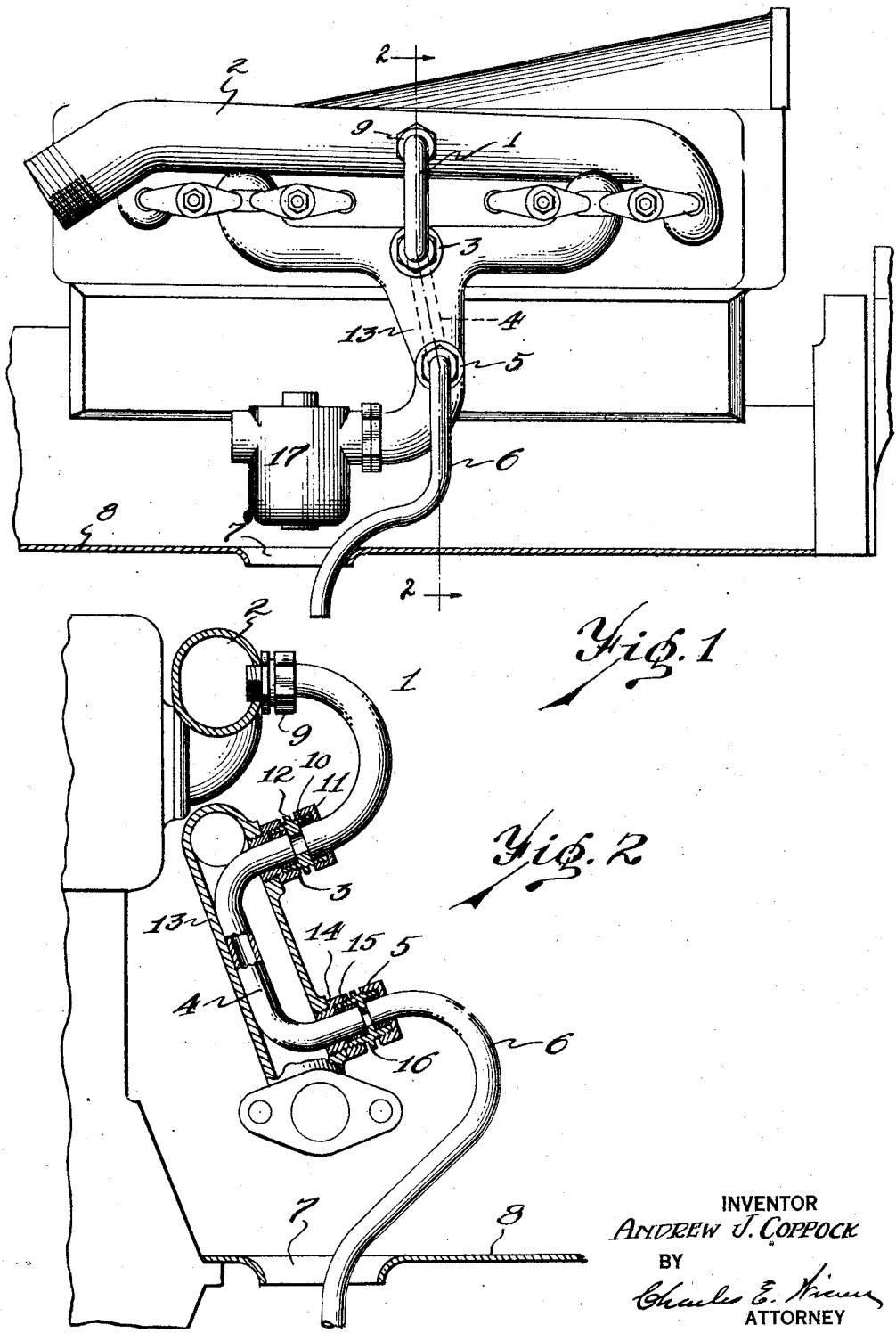

1,632,951

UNITED STATES PATENT OFFICE.

ANDREW J. COPPOCK, OF DETROIT, MICHIGAN.

FUEL VAPORIZER.

Application filed January 26, 1920. Serial No. 354,096.

This invention relates to means for internally heating intake manifolds of internal combustion engines, the object being to provide a heated member within the intake manifold to heat the fuel mixture on its way to the cylinders of the engine. The principal feature of the invention is involved in the provision of means whereby a conduit leading from the exhaust manifold may allow the hot exhaust gases to pass through a conduit extending into and out of the intake manifold. A further object of the invention is to provide a conduit of sectional form whereby the same may be readily assembled in intake and exhaust manifolds of an engine subsequent to the assembly of the intake and exhaust manifolds in the engine whereby but little work is required to be performed to fit the manifolds for the use of the sectional conduit. A further feature is to provide a conduit as stated, sectional in form and the sections decreasing in size from the inlet end in the exhaust manifold to the discharge end thereof whereby the flow of the heated gases from the exhaust manifold is to a certain extent choked and does not freely flow but tends to flow somewhat slowly therethrough whereby the conduit becomes quickly heated but further does not become overheated as would be the case if an entirely free flow of heated exhaust gases were permitted. These several objects and novel features of the invention are hereinafter more fully described and claimed and the preferred form of construction embodying my invention is shown in the accompanying drawings in which—

Fig. 1 is an elevation partly in section showing my improved device for internally heating intake manifolds.

Fig. 2 is a cross section through the manifolds and conduit for heating gases taken on line 2—2 of Fig. 1.

It is to be understood that this device may be made in various forms as may be required by internal combustion engines of various types in some of which the exhaust manifold is upon one side of the cylinder and intake upon the other and in some of which both manifolds are upon the same side of the cylinder block as is the case in the engine illustrated. In either case the heated conduit is formed in sections of the type shown and in the drawings there is a curved member 1 leading from the exhaust manifold 2 to which it is attached by means of a nut 9. This tube 1 is curved downward and secured in a coupling 3 to which is also secured a U shaped tubular member 4 connected at its opposite end with a coupling 5 to which is also attached the terminal tube 6 leading downward through an opening 7 provided in the drip pan 8.

To permit the assembling of this sectional heating conduit with the exhaust and intake manifold the exhaust manifold is provided with a threaded aperture to receive the nut 9 in which the end of the tube 1 is secured. This nut is a two part nut somewhat similar to that shown at 3 and 5. The tubes at the ends are provided with the usual slip sleeve and this sleeve is engaged between the flanged nut 11 and central portion 12 as shown at 3. This contacts each end of the sleeve 10 tending to compress it and causing it to grasp the end of the tube and prevent its withdrawal. Likewise the member 4 is secured to the opposite end of the member 12 in each coupling 3 and 5 and the member 6 is attached to the coupling 5 in like manner. The intake manifold 13 is provided with two spaced apertures in which the coupling members 3 and 5 have a threaded relation and this U tube 4 with a portion of the coupling member thereon at one end is passed down into the conduit 13 and out through the aperture for the coupling 5 whereupon the portion 14 of the said coupling is placed over the end of the tube, the sleeve 15 placed thereon and thereafter the member 16 threaded into the member 14 to compress the sleeve 15. These coupling members permit the ready introduction of the tube in position and the assembly thereof in the general relation shown at very little expense. Preferably, the tube 1 is for a small engine, as for instance the engine in the Ford automobile. The tube 1 is about five-eighths of an inch in diameter and the tube 4 one-half an inch in diameter and the tube 6 about seven-sixteenths of an inch in diameter, and this tube leads through the aperture 7 usually formed beneath the carburetor 17 and thus discharges beneath the engine a sufficient distance therefrom to prevent accidental ignition of any gaseous fuel dripping from the carburetor. In fact the possibility of ignition is practically avoided by use of the tubes of decreasing diameter as described as the heated gases flowing from the end of the tube have practically lost a major portion of the heat to such extent at least as to avoid the possibility of ignition. However, the tube 6 may be carried downward and backward beneath the car to a point remote from the carburetor to avoid all possibility of accidental ignition.

With the sections of the tube increasing in diameter consecutively as described, the section within the intake manifold is not liable to become overheated due to the fact that all of the gas in this section is not discharged at each exhaust stroke of the engine as would be the case if the several sections were of the same diameter from inlet to outlet. All of the exhaust gases in the tube previous to a succeeding exhaust charge are not forced out of the heater due to the fact that the decreasing diameter of the sections acts to choke the flow therethrough tending to retain partially cooled gas in the section. With such cooled gas in the heater, a succeeding exhaust charge tends to force the cooled gases out of the heater. With such an arrangement the first or inlet section which is exposed to atmosphere enables the gas to lose part of its heat and this cooled gas is forced forward through the other sections at somewhat less temperature than the temperature of the gases in the exhaust manifold 2. The tube section 4 thus does not become overheated and cause an ignition of the fuel in the intake manifold.

With this portion 4 inserted within the intake manifold the gas within the manifold is heated almost from the first explosion of the engine by means of which a part of the heated gases flow through the tube 4. These tubes, particularly the tube 4, are formed of a thin copper wall to readily permit the transference of heat. Furthermore, this tube 4 being directly in the path of the gaseous fuel flowing from the carburetor tends to vaporize the fuel producing a fuel fully gasified or vaporized prior to introduction into the cylinders and thus is in condition to be readily fired. One of the features of the invention is in the provision of the sectional conduit decreasing in size from the exhaust manifold to the discharge end preventing a free flow of heated gases from the exhaust manifold and thus tending to retain some of the heated gases within the tube and to some extent choking the flow thereby preventing too great a volume of gas passing through the tubes which would tend to overheat the same. In case the exhaust tube 2 is on the opposite side of the cylinder from that shown in Fig. 2, the tube 1 would necessarily be of a length to continue over the cylinder head to the exhaust manifold on the opposite side and remaining portions of the tube would remain the same as here shown, the principle of operation being identical in either arrangement.

From the foregoing description it is evident that the device is simple and inexpensive in form and may be assembled with little labor cost on engines even subsequent to their erection and use without disturbing the assembled relationship of the engine manifolds.

Having thus briefly described my invention, what I claim and desire to secure by Letters Patent of the United States is—

1. A fuel vaporizer comprising the combination with the exhaust and intake manifolds of an internal combustion engine, the intake manifold having a pair of spaced apertures in one wall thereof, of a conduit formed of detachable sections curved in form and of successively decreasing diameter, one of said sections being U-shaped in form and lying within the intake manifold with the ends thereof projecting through the said apertures, the other of said sections being detachably connected respectively to the projecting ends, the section of larger diameter being connected with the exhaust manifold of the engine.

2. A fuel vaporizer comprising the combination with the exhaust and intake manifolds of an internal combustion engine, the intake manifold having a pair of spaced apertures in one side thereof, of a conduit formed of detachable sections connected together, the first of the sections being connected with an exhaust manifold, the next section being U-shaped in form and lying within the intake manifold with the ends thereof projecting through the said apertures and the third section connected with the discharge end of the second section, the last section being less in diameter than the section within the intake manifold.

3. A fuel vaporizer comprising the combination with the intake and exhaust manifold of an internal combustion engine, the intake manifold having a pair of spaced apertures in the same side, of a conduit formed of detachable sections, one of the sections being connected with the exhaust manifold, a second section being U-shaped in form and lying within the intake manifold with the ends projecting through the said apertures and a third section discharging to atmosphere, said apertures being greater in diameter than the section therewithin, coupling members each having a part threaded in an aperture and connecting the section ends with the first section and third sections respectively, the sections successively decreasing in diameter.

In testimony whereof, I sign this specification.

ANDREW J. COPPOCK.